United States Patent
Tominaga et al.

(10) Patent No.: US 6,441,093 B2
(45) Date of Patent: Aug. 27, 2002

(54) THERMOPLASTIC ELASTOMER COMPOSITION FOR CALENDER-MOLDING AND SHEETS PREPARED THEREFROM

(75) Inventors: Takeshi Tominaga, Sodegaura; Nobuhiro Natsuyama, Ichihara; Hironobu Shigematsu, Ichihara; Tatsuo Hamanaka, Ichihara; Makoto Makino, Sodegaura, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 3 days.

(21) Appl. No.: 09/774,606

(22) Filed: Feb. 1, 2001

(30) Foreign Application Priority Data

Feb. 10, 2000 (JP) ........................................ 2000-033291
Mar. 23, 2000 (JP) ........................................ 2000-081598

(51) Int. Cl.$^7$ ............................ C08L 23/10; C08L 23/26
(52) U.S. Cl. .................... 525/191; 525/216; 525/232; 525/240
(58) Field of Search ................................ 525/191, 216, 525/232, 240

(56) References Cited

U.S. PATENT DOCUMENTS 5,118,753 A * 6/1992 Hikasa et al. ............... 524/525
5,180,769 A * 1/1993 Hikasa et al. ............... 524/525

FOREIGN PATENT DOCUMENTS

| JP | 58-141224 | 8/1983 |
| JP | 5-9342 | 1/1993 |
| JP | 6-1889 | 1/1994 |
| JP | 7-26077 | 1/1995 |
| JP | 7-133379 | 5/1995 |
| JP | 7-166012 | 6/1995 |
| JP | 7-188483 | 7/1995 |
| JP | 8-176358 | 7/1996 |
| JP | 9-194647 | 7/1997 |

* cited by examiner

Primary Examiner—Nathan M. Nutter
(74) Attorney, Agent, or Firm—Sughrue Mion, PLLC

(57) ABSTRACT

A thermoplastic elastomer composition for calender-molding obtained by dynamically heat-treating a mixture comprising 40 to 95% by weight of (A) an oil-extended olefin copolymer rubber containing 100 parts by weight of an olefin copolymer rubber having a Mooney viscosity ($ML_{1+4}$ 100° C.) of 120 to 350 and 20 to 150 parts by weight of mineral oil softening agent and 60 to 5% by weight of (B) a polypropylene resin, a process for producing a calendered sheet from the composition and a sheet obtained by the process.

12 Claims, No Drawings

THERMOPLASTIC ELASTOMER COMPOSITION FOR CALENDER-MOLDING AND SHEETS PREPARED THEREFROM

BACKGROUND OF THE INVENTION

1. Field of the Invention

The present invention relates to a thermoplastic elastomer composition for calender-molding and a sheet prepared therefrom. More particularly, the invention relates to a thermoplastic elastomer composition containing an olefin copolymer rubber and a polypropylene resin, said composition being excellent in calender moldability and being capable of producing a calendered sheet superior in appearance, and to a sheet obtained by subjecting the thermoplastic elastomer composition to calender-molding.

2. Description of Related Arts

Thermoplastic elastomers containing an olefin copolymer rubber and a polypropylene resin have found use in widespread fields, including automobile parts, electric home appliances, sundry goods and so on, making a good use of the characteristics thereof that they need not the vulcanization step and they can be processed with a molding machine for ordinary thermoplastic resins.

One example of methods for molding thermoplastic elastomers into a sheet is a calender molding. It is known that this method is superior in productivity compared to other molding methods, for example, extrusion molding with T-die or the like, the method had a problem, however, that the appearance of the obtained sheet was deteriorated by winding and adhesion of a thermoplastic elastomer around rollers when the thermoplastic elastomer was subjected to the calender molding. In order to overcome this problem, there is proposed a composition improved by adding an ethylene-based polymer resin and a higher fatty acid amide and the like to a thermoplastic elastomer (JP-A-7-166012). The addition resulted in problems, however, that the composition and hence use to be applied were limited or the appearance was deteriorated by bleeding of the higher fatty acid amide on the sheet surface.

SUMMARY OF THE INVENTION

Under these circumstances, an object of the present invention is to provide a thermoplastic elastomer composition having an excellent calender processability, which is capable of providing a calendered sheet having a good appearance, by selecting a specified polypropylene resin constituting the composition, without troublesome steps in which an ethylene polymer resin described above or the like are additionally mixed, and a sheet.

That is, the present invention relates to a thermoplastic elastomer composition for calender-molding obtained by dynamically heat-treating a mixture comprising 40 to 95% by weight of the component (A) and 60 to 5% by weight of the component (B) respectively described below:

(A) an oil-extended olefin copolymer rubber containing 100 parts by weight of an olefin copolymer rubber having a Mooney viscosity ($ML_{1+4}100°$ C.) of 120 to 350 and 20 to 150 parts by weight of a mineral oil softening agent, and (B) a polypropylene resin composed of a propylene homopolymer as a first segment and a propylene-ethylene random copolymer having an intrinsic viscosity of tetralin solution at a temperature of 135° C. of 0.5 to 6.0 dl/g and a weight ratio of ethylene to propylene of 10/90 to 60/40 as a second segment, wherein the weight ratio of the first segment to the second segment is 95/5 to 50/50.

Additionally, the present invention provides a sheet obtained by calender-molding the thermoplastic elastomer composition as above.

DETAILED DESCRIPTION OF THE INVENTION

The present invention will be described below in detail.

The component (A) used in the present invention is an oil-extended olefin copolymer rubber containing 100 parts by weight of an olefin copolymer rubber having a Mooney viscosity ($ML_{1+4}100°$ C.) of 120 to 350 and 20 to 150 parts by weight of mineral oil softening agent.

The olefin copolymer rubber is a rubber containing olefin units as a major component. Examples of the olefin copolymer rubber include, ethylene-α-olefin (e.g. propylene, 1-butene, 1-hexene, 1-octene) copolymer rubbers and ethylene-α-olefin (e.g. propylene, 1-butene, 1-hexene, 1-octene)-non-conjugated diene copolymer rubbers such as, for example, ethylene-propylene copolymer rubber (EPM), ethylene-propylene-non-conjugated diene copolymer rubber (EPDM), ethylene-1-butene-non-conjugated diene copolymer rubber and α-olefin-conjugated diene copolymer rubbers such as propylene-butadiene copolymer rubber. Among them, ethylene-propylene-non-conjugated diene copolymer rubber is particularly preferred from the viewpoint of a balance among various physical properties of molded products. The non-conjugated diene includes dicyclopentadiene, 1,4-hexadiene, 1,5-cyclooctadiene, 5-methylene-2-norbornene, 5-ethylidene-2-norbornene and the like, and 5-ethylidene-2-norbornene is particularly preferred.

A preferred specific example is ethylene-propylene-5-ethylidene-2-norbornene copolymer rubber in which the content of propylene is 10 to 55% by weight, preferably 20 to 40% by weight, and the content of non-conjugated diene such as 5-ethylidene-2-norbornene or the like is 1 to 30% by weight, preferably 3 to 20% by weight. When the content of propylene is less than 10% by weight, the flexibility may be lost, and when it is more than 55% by weight, the mechanical property may be lowered. When the content of non-conjugated diene represented by 5-ethylidene-2-norbornene is less than 1% by weight, the mechanical property may be lowered, and when it is more than 30% by weight, the durability such as light resistance, heat ageing property or the like may be lowered. The Mooney viscosity ($ML_{1+4}100°$ C.) of the olefin copolymer rubber is 120 to 350 and preferably 140 to 300. When the Mooney viscosity is too low, the mechanical strength is deteriorated, and when the Mooney viscosity is top nigh, the production of good sheet becomes difficult by the reason that the surface of molded sheet becomes rough or others.

As the mineral oil softening agent, higher boiling petroleum fractions are used, and examples thereof include paraffin-based oil, naphthene-based oil, aromatic oil or the like, and paraffin-based oil is preferable because it provide a thermoplastic elastomer composition excellent in stain resistance and durability such as light resistance, and articles of clear or light-color of the composition. The content of the mineral oil softening agent is 20 to 150 parts by weight, preferably 30 to 120 parts by weight, more preferably 35 to 80 parts by weight based on 100 parts by weight of the olefin copolymer rubber. When the content of the mineral oil softening agent is less than 20 parts by weight, the flowability of the thermoplastic elastomer composition is lowered and the processability in calender-molding is deteriorated. On the other hand, when the content is more than 150 parts by weight, the plasticity is so increased that the adhesiveness to calender rolls becomes extremely high, the processability becomes bad and, in addition, performances such as physical properties of the molded article are lowered.

The Mooney viscosity ($ML_{1+4}100°$ C.) of the oil-extended olefin copolymer rubber as the component (A) is preferably 30 to 100 and more preferably 40 to 90. When the Mooney viscosity is less than 30, the adhesiveness to calender rolls may be increased or the mechanical properties become low. On the other hand, when it is more than 100, the production of smooth sheet may become difficult because the surface of sheet obtained by calendar-molding becomes rough.

Use of an olefin copolymer rubber with a Mooney viscosity of 120 to 350 as described above and addition of the mineral oil softening agent in the above-described amount enable production of an olefin thermoplastic elastomer composition which is capable of simultaneously satisfying both requirements, i.e., improvement in processability and improvement in mechanical properties by gift of flexibility and increase of flowability. In general, mineral oil softening agents are used as agents for increasing flowability in olefin thermoplastic elastomer composition. According to studies of the inventors, however, when an oil-extended rubber is not used, addition of 40 parts by weight or more of mineral oil softening agent based on 100 parts by weight of rubber contained in the olefin thermoplastic elastomer composition is not preferred because it results in bleed of the softening agent on the surface of the thermoplastic elastomer composition and staining or adhesion of molded article occur, regardless of the viscosity of the rubber. When an oil-extended rubber previously mixed with 20 to 150 parts by weight of mineral oil softening agent based on 100 parts by weight of the olefin copolymer rubber having a 100° C. Mooney viscosity of 120 to 350 is used, however, bleed of the softening agent and staining or adhesion of the article do not occur, and a thermoplastic elastomer composition superior in physical properties such as break strength, elongation at break, compressive permanent strain and the like can be obtained.

Oil-extension can be performed by a known method. Such method includes an oil-extension method in which a rubber and a mineral oil softening agent are mechanically kneaded with an apparatus such as rolls or a Banbury mixer, a method in which a predetermined amount of the mineral oil softening agent is added to a solution in which the rubber is dissolved with a solvent and then removing the solvent by a method such as steam stripping or the like. A preferred method is a method using a rubber solution. The method is carried out more easily using a rubber solution obtained by polymerization.

The component (B) is a polypropylene resin composed of a propylene homopolymer as a first segment and a propylene-ethylene random copolymer having an intrinsic viscosity of tetralin solution at a temperature of 135° C. of 0.5 to 6.0 dl/g and a weight ratio of ethylene to propylene of 10/90 to 60/40 as a second segment, wherein the weight ratio of the first segment to the second segment is 95/5 to 50/50.

The intrinsic viscosity of a tetralin solution at a temperature of 135° C. of the first segment is preferably 0.5 to 3.0 dl/g and more preferably 0.9 to 1.5 dl/g. When the viscosity is less than 0.5 dl/g, the mechanical strength may become lowered. On the other hand, when said viscosity is more than 3.0 dl/g, the directional property by orientation during molding of sheet may become greater so that wrinkle is liable to be formed in post-forming.

The second segment is composed of a propylene-ethylene random copolymer having an intrinsic viscosity of a tetralin solution at a temperature of 135° C. of 0.5 to 6.0 dl/g and a weight ratio of ethylene to propylene of 10/90 to 60/40, preferably 25/75 to 50/50 and more preferably 30/70 to 50/50.

When the viscosity is less than 0.5 dl/g, the flowability becomes higher and the processability of the sheet is lowered. On the other hand, when the viscosity is more than 6.0 dl/g, the appearance of a molded article obtained is deteriorated by the formation of the granular structure.

When the ratio of ethylene to propylene is less than 10/90, the compatibility to the oil-extended olefin copolymer rubber as the component (A) is lowered and the surface, flexibility and so on of the molded sheet is deteriorated. On the other hand, when the ratio is more than 60/40, the compatibility between the first segment and the second segments is lowered and a decrease in mechanical strength or a deterioration of the surface of molded sheet occurs.

The weight ratio of the first segment to the second segment in the polypropylene resin (B) is 95/5 to 50/50 and preferably 90/10 to 70/30. When the weight ratio of the first segment to the second segment is less than 50/50, the appearance may be deteriorated by a decrease in the flowability. On the other hand, when the ratio is more than 95/5, the compatibility to the oil-extended olefin-based copolymer rubber is lowered and a deterioration of surface may occur.

The polypropylene resin as the component(B) can be produced by a well-known method, and is generally called as "propylene-ethylene block copolymer". For example, the polypropylene resin can be produced by polymerizing propylene with a stereoregular olefin polymerization catalyst (e.g. a Ziegler-Natta catalyst, a metallocene catalyst) to obtain a propylene homopolymer as the first segment in the first step, and subsequently copolymerizing propylene and ethylene in the presence of a polymerization mixture produced in the first step to obtain a propylene ethylene random copolymer as the second segment in the second step.

The melt flow rate (hereinafter, referred to as "MFR") of the polypropylene-based resin (B) measured under a load of 2.16 kg at a temperature of 230° C. according to JIS K-6758 is preferably 0.1 to 100 g/10 minutes, more preferably of 0.5 to 50 g/10 minutes, and most preferably of 5 to 40 g/10 minutes. When MFR is less than 0.1 g/10 min., the surface of the molded article is deteriorated. On the other hand, when MFR is more than 100 g/10 min., the molding into sheet may not be performed by adhesion onto rolls.

The thermoplastic elastomer composition of the present invention is obtained by dynamically heat-treating a mixture containing 40 to 95% by weight of the component (A) and 60 to 5% by weight of the component (B) in the presence of an organic peroxide, preferably in the presence of an organic peroxide and a crosslinking aid to crosslinked the components.

The contents of (A) and (B) are respectively 40 to 95% by weight and 60 to 5% by weight, and preferably 60 to 90% by weight and 10 to 40% by weight. Herein, the sum of (A) and (B) is 100% by weight. When the amount of (A) is less than 40% by weight, the flexibility of the molded article is deteriorated. On the other hand, when the amount of (A) is more than 95% by weight, the flowability is lowered causing bad appearance of the molded article.

As to methods for subjecting the composition to dynamic heat-treatment, a method in which the crosslinking is effected using an organic peroxide can conveniently obtain a thermoplastic elastomer composition for calender-molding providing a good molded article with less odor and staining.

The organic peroxide include 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-di(t-butylperoxy)-3,5,5-trimethylcyclohexane, 2,5-dimethyl-2,5-di(peroxybenzoyl)hexyne-3, dicumylperoxide and the like. Among them, 2,5-dimethyl-2,5-di(t-butylperoxy)hexane is particularly preferred from the viewpoint of odor and scorching.

The amount of the organic peroxide is preferably 0.005 to 2.0 parts by weight, more preferably 0.01 to 0.6 parts by weight, based on 100 parts by weight of the sum of (A) and (B). When the amount is less than 0.005 parts by weight, the effect on the crosslinking may be small. On the other hand, when it is more than 2.0 parts by weight, control of the reaction may become difficult and it may be disadvantageous in economical.

In the crosslinking using an organic peroxide, it is preferred to add a polyfunctional compound as a crosslinking aid because a thermoplastic elastomer composition providing a molded article having a good hue or appearance is obtained. Examples thereof include bismaleimide compounds such as N,N'-m-phenylenebismaleimide, tolylenebismalimide and the like; methacrylate compounds such as ethylene glycol dimethacrylate, polyethylene glycol dimethacrylate, trimethylolpropane trimethacrylate, allyl methacrylate, diethylene glycol dimethacrylate, triethylene glycol dimethacrylate, 1,3-butylene glycol dimethacrylate, 1,6-hexanediol dimethacrylate, propylene glycol dimethacrylate and the like; p-quinone dioxime, nitrobenzene, diphenylguanidine, trimethylolpropane, divinylbenzene and the like.

Particularly, among them, methacrylate compounds as a crosslinking aid are more preferred because a thermoplastic elastomer composition providing a molded article having better hue and appearance is obtained. Among methacrylate crosslinking aids, trimethylolpropane trimethacrylate is particularly preferred.

By addition of the crosslinking aid, a uniform and gentle reaction takes place and improvement of mechanical properties become possible. The amount of the crosslinking aid can usually be selected within a range of 0.01 to 4.0 parts by weight, and preferably 0.05 to 2.0 parts by weight based on 100 parts by weight of the sum of (A) and (B). When the amount is less than 0.01 parts by weight, the effect of addition may not be obtained. On the other hand, when the amount exceeds 4.0 parts by weight, the addition of the excess amount does not contribute to the effect and may result in disadvantage in economical.

The degree of crosslinking is not particularly limited but the crosslinking is preferably stopped around partial crosslinking. This means that, at such degree, a few percent of the component (B) dissolves in a solvent for rubber after crosslinking. By this procedure, a calendered sheet showing a good elongation behavior, applicable to a large molded article when a molded sheet is subjected to post-forming such as vacuum forming, is obtained.

The crosslinking by dynamic heat-treatment in the presence of an organic peroxide can be carried out, for example, as follows.

The components (A), (B), an organic, peroxide, and optionally a crosslinking aid are mixed in a predetermined ratio and dynamically heat-treated. In other words, they are melted and kneaded. As an apparatus for mixing and kneading, a known non-open type kneader such as a Banbury mixer, a twin-screw extruder or the like. The temperature for kneading and period may be 150 to 300° C. and 30 seconds to 10 minutes, respectively. In the production of the composition, auxiliary materials such as inorganic fillers, antioxidants, weathering agents, antistatic agents, coloring agents and others can be added, if necessary.

More particularly, the components (A), (B) and optionally a crosslinking aid and auxiliary materials are mixed in a predetermined ratio, sufficiently kneaded for homogenization with a Banbury mixer or the like as a non-open type kneader within a temperature range of 150 to 300° C., preferably 150 to 250° C., and then the obtained composition is sufficiently blended with an organic peroxide in a closed type mixer such as a tumbler, supermixer or the like. Subsequently, the blended product can be dynamically heat-treated at 200to 300° C. with a kneading apparatus having a strong kneading force such as a twin-screw continuous extruder or the like to give a crosslinked thermoplastic elastomer composition.

In the calender-molding, for example, a lubricant is preferably added as an auxiliary material. The lubricant shows some degree of compatibility with the molten composition in the calender-molding of the composition of the present invention, inhibits adhesion of it to roll surface by decreasing the friction with the roll surface, and makes easier the molding.

Specific examples of the lubricant include (a) paraffinic higher hydrocarbons s paraffin wax, montan wax and hydrogenated castor oil as ; (b) higher fatty acids such as stearic acid, palmitic acid, lauric acid and oleic acid; (c) metal salts of higher fatty acids such as magnesium stearate, calcium stearate, aluminum stearate and zinc stearate; (d) higher fatty acid amides such stearamide, oleamide, lauramide, ethylene bisstearamide and ethylene bislauramide; (e) higher fatty acid alkyl esters such as butyl stearate, ethylene glycol monostearate, glycerol distearate, succinic acid monoglyceride, citric acid monoglyceride and octadecyl citrate; (f) higher fatty alcohols such as stearyl alcohol, palmityl alcohol, oleyl alcohol and lauryl alcohol: (g) polyethers such ethylene oxide-propylene oxide copolymer; (h) phthalic acid esters such as bis(2-ethylhexyl) phthalate; (i) diamine-carboxylic acid condensates such as xylylenediamine-aliphatic carboxylic acid condensate; (j) silicones such as polydimethylsoloxane; and the like. The lubricant can be used alone or in admixture of two or more. The amount of the lubricant is preferably 0.05 to 2 parts by weight, more preferably 0.05 to 1 part by weight based on 100 parts by weight of the crosslinked composition according to the present invention. When the amount is less than 0.005 parts by weight, the effect of the addition may difficultly appear. On the other hand, when the amount is more than 2 parts by weight, exudation on the surface, deterioration of physical properties such as fogging in the production of thermoplastic elastomer composition and the like may occur. In this respect, particularly preferred lubricants are (c) and (e). Examples include "Poem B-10" (trade name, manufactured by Riken Vitamin company, limited) and "Kaowax 230-2" (trade name, manufactured by Kao Corporation). Since (d) described above deteriorates the appearance of the surface even at a small amount, its co-use is preferably avoided or should be in an amount as small as possible. The auxiliary materials described above can be added either at a step of producing the thermoplastic elastomer composition of the invention as described later, or at calender-molding.

The thermoplastic elastomer composition of the invention may contain an inorganic filler such as calcium carbonate, calcium silicate, clay, kaolin, talc, silica, diatomite, powdery mica, asbestos, alumina, barium sulfate, aluminum sulfate, calcium sulfate, basic magnesium carbonate, molybdenum disulfide, graphite, glass fiber, glass sphere, shirasu balloon, carbon fiber and the like, or a coloring agent such as carbon black, titanium oxide, zinc flower, red oxide, ultramarine, prussian blue, azo pigments, nitroso pigments, lake pigments, phthalocyanine pigments or the like, insofar as they do not adversely affect flowability and rubbery properties. In addition, in the present invention, the composition may contain known heat stabilizers such as phenol-based, sulfite-based, phenylalkane-based, phosphite-based or amine-based stabilizers, anti-aging agents, weathering stabilizers, antistatic agents or the lice in an amount usually used in olefin plastics or olefin copolymer rubber.

The thermoplastic elastomer composition of the present invention has an excellent processability for calender-molding when the composition is molded with a calender-molding apparatus used in common thermoplastics.

In addition, since the component (A) is crosslinked, the thermoplastic elastomer composition of the invention is excellent in thermal resistance, whether resistance and tensile property, and rubber properties such as flexibility and impact resilience, and good in flowability. Therefore, the composition enables high speed molding by calender-molding and allows forming a molded article with a good appearance.

The use of the calender-molded sheet produced from the thermoplastic elastomer composition include car parts such as a body panel, side shield, skin of internal trim parts and the like, foot wears such as a sole, sandal and the like, leisure goods such as a swimming pool, swimming fin and the like, and other product such as gasket, water proof cloth, belt and the like.

EXAMPLES

The present invention will be described in detail with reference to Examples below, but is not limited thereto.

In the Examples and Comparative Examples, the following test methods were used for measurement of processability in calender-molding and physical properties.

(1) Mooney viscosity ($ML_{1+4}100°$ C.): Mooney viscosity of an oil-extended EPDM was measured according to ASTM D-927-57T. The Mooney viscosity of EPDM was calculated according to the following formula:

$$\log(ML1/ML2)=0.0066(\Delta PHR)$$

ML1: Moony viscosity of EPDM

ML2: Mooney viscosity of oil-extended EPDM

ΔPHR: Amount of extender oil per 100 parts by weight of EPDM (2) Processability in calender-molding: pellets were wound at a roll temperature of 170° C., a guide width of 30 cm and a roll gap of 1 mm using two rolls (8 inches roll, manufactured by Kansai Roll, Ltd.), given with mixing for 3 minutes, and then cut out from the rolls after changing the roll gap to 0.6 mm and standing for 5 minutes. Evaluations were given for surface of the molded sheet, the shape of bank while testing and adhesion to the heated rolls.

The criteria are as follows:

(1) Adhesion to heated roll
  ○ excellent in processability because adhesion was low during 8 minutes
  Δ good during 3 minutes from the beginning, but processing became difficult because of large adhesion after the gap was narrowed
  × processing was difficult during 3 minutes from the beginning because adhesion became large
  ×× evaluation was impossible because adhesion became large soon after pellets (sample) was wound (2) Shape of bank
  ○ uniform shape without disorder
  Δ disorder sometimes appeared
  × normal bank was not formed because disorder always appeared (3) Surface of molded product
  ○ excellent
  Δ slightly bad
  × bad

Example 1

Into 5 wt % hexane solution of EPDM ($ML_{1+4}100°$ C.: 143: propylene content; 30% by weight; iodine value; 10) was added 40 parts by weight of a mineral oil softening agent (Diana Process Oil PW-380, manufactured by Idemitsu Kosan, Ltd.) per 100 parts by weight of EPDM. Then, 70 parts by weight of oil-extended EPDM 1 ($ML_{1+4}100°$ C.: 78) de-solvated by steam stripping, 30 parts by weight of polypropylene 1 (MFR: 15 g/10 minutes, weight ratio of first segment to second segment: 86/14, weight ratio of ethylene to propylene in second segment: 35/65, intrinsic viscosity of tetralin solution at a temperature of 135° C. (hereinafter, referred to as "η1") of first segment: 1.3 dl/g, intrinsic viscosity of tetralin solution at a temperature of 135° C. (hereinafter, referred to as "η2") of second segment: 2.4 dl/g), 0.5 part by weight of Sumisorb 300 (manufactured by Sumitomo Chemical Company, Ltd.) as a light stabilizer, 0.1 part of Irganox 1010 (manufactured by Ciba Speciality Chemicals, Ltd.) as a heat stabilizer, 0.1 part by weight of Poem B-10 (manufactured by Riken Vitamin Company, Ltd) as a lubricant and 0.4 part by weight of Sumifine BM (N,N'-m-phenylenebismaleimide, manufactured by Sumitomo Chemical Ind., Ltd.) as a crosslinking aid were kneaded in a Banbury mixer at 170 to 200° C. for 7 minutes and formed into a master batch in the form of pellets using an extruder. Subsequently, 0.04 part by weight of 2,5-dimethyl-2,5-di(t-butylperoxy)hexane per 100 parts by weight of the master batch was added as an organic peroxide and they were homogeneously blended for 10 minutes using a Henschel mixer. The blended product was dynamically heat-treated at 230° C.±20° C. for 60 seconds using a twin screw kneading extruder capable of giving a strong kneading strength to provide a partially crosslinked composition. The results of evaluation are shown in Table 1.

Example 2

The procedure in Example 1 was repeated except that, in the preparation of the master batch, Poem B-10 was replaced with 0.1 part by weight of Kaowax 230-2. The results of evaluation are shown in Table 1.

Comparative Example 1

The procedure in Example 1 was repeated except that, in the preparation of the master batch, polypropylene 1 was replaced with 30 parts by weight of polypropylene 2 (MFR: 13 g/10 minutes, weight ratio of first segment to second segment: 100/0, η1: 1.45 dl/g). The results of evaluation are shown in Table 1.

Comparative Example 2

The procedure in Example 1 was repeated except that, in the preparation of the master batch, EPDM 1 was replaced by 86.7 parts by weight of EPDM 2(oil-extended EPDM 2 ($ML_{1+4}100°$ C.: 53) de-solvated by steam stripping, after adding 100 parts by weight of a mineral oil softening agent (Diana Process Oil PW-380, manufactured by Idemitsu Kosan, Ltd.) per 100 parts by weight of EPDM to 5 wt % hexane solution of EPDM ($ML_{1+4}100°$ C.: 242, propylene content: 30% by weight, iodine value: 10), polypropylene 1 was replaced by 13.3 parts by weight of polypropylene 2 (MFR: 13 g/10 minutes; weight ratio first segment/second segment: 100/0; η1: 1.45 dl/g); the amount of Sumifine BM as a crosslinking aid was changed to 0.7 part by weight, and the amount of organic peroxide used in crosslinking was changed to 0.08 part by weight. The results of evaluation are shown in Table 1.

Comparative Example 3

The procedure in Example 1 was repeated except that, in the preparation of the master batch, polypropylene 1 was replaced by 30 parts by weight of polypropylene 3 (MFR: 1.5 g/10 minutes; weight ratio of first segment to second segment: 0/100), and the amount of Sumifine BM as a crosslinking aid was changed to 0.2 part by weight. The results of evaluation are shown in Table 1.

TABLE 1

|  | Example 1 | Example 2 | Comparative Example 1 | Comparative Example 2 | Comparative Example 3 |
|---|---|---|---|---|---|
| Oil-extended EPDM 1 | 70 | 70 | 70 | — | 70 |
| Oil-extended EPDM 2 | — | — | — | 86.7 | — |
| Polypropylene 1 | 30 | 30 | — | — | — |
| Polypropylene 2 | — | — | 30 | 13.3 | — |
| Polypropylene 3 | — | — | — | — | 30 |
| Sumisorb 300 | 0.05 | 0.05 | 0.05 | 0.05 | 0.05 |
| Irganox 1010 | 0.1 | 0.1 | 0.1 | 0.1 | 0.1 |
| Poem B-10 | 0.1 | — | — | 0.1 | 0.1 |
| Kaowax 230-2 | — | 0.1 | — | — | — |
| Sumifine BM | 0.4 | 0.4 | 0.4 | 0.7 | 0.2 |
| Master batch | 100 | 100 | 100 | 100 | 100 |
| Organic peroxide | 0.04 | 0.04 | 0.04 | 0.08 | 0.04 |
| Adhesion to heated roll | Δ | Δ | xx | X | X |
| Shape of bank | ○ | ○ | — | ○ | Δ |
| Surface of molded product | ○ | ○ | — | X | X |

70 parts by weight of oil-extended EPDM 1, 30 parts by weight of polypropylene 4(MFR: 0.9 g/10 minutes, weight ratio of first segment to second segment: 84/16; weight ratio of ethylene to propylene in second segment: 35/65; [η1]: 2.3 dl/g; [η2]: 4.5 dl/g). 0.05 part by weight of Sumisorb 300 (manufactured by Sumitomo Chemical Company, Ltd.), 0.1 part of Irganox 1010 (manufactured by Ciba Speciality Chemicals, Limited), 0.05 part by weight of Kaowax 230-2 (manufactured by Kao Corp.), and 0.1 part by weight of trimethylolpropane trimethacrylate were kneaded in a Banbury mixer at 170 to 200° C. for 7 minutes to obtain a master batch. The obtained kneaded product was passed through open rolls to form a sheet, which was converted to square pellets by a sheet-pelletizer. Subsequently, 0.32 part by weight of 2,5-dimethyl-2,5-di(t-butylperoxy)hexane per 100 parts by weight of pellets of the master batch was added and they were homogenously blended for 10 minutes using a tumbler mixer. The blended product was dynamically heat-treated at 230° C.±20° C. for 60 seconds using a twin screw kneading extruder capable of giving a strong kneading strength to provide a partially crosslinked composition. The results of evaluation are shown in Table 2.

Example 4

The procedure in Example 3 was repeated except that polypropylene 4 was changed 30 parts by weight of polypropylene 5(MFR: 3g/10 minutes, weight ratio of first segment to second segment: 83/17; weight ratio of ethylene to propylene in second segment: 37.5/62.5; [η1]: 1.8 dl/g; [η2]: 3.1 dl/g), and the amount of the organic peroxide was changed to 0.2 parts by weight per 100 parts by weight of the master batch. The results of evaluation are shown in Table 2.

TABLE 2

|  | Example 1 | Example 2 |
|---|---|---|
| Oil-extended EPDM | 70 | 70 |
| Polypropylene 4 | 30 | — |
| Polypropylene 5 | — | 30 |
| Sumisorb 300 | 0.05 | 0.05 |
| Irganox 1010 | 0.2 | 0.2 |
| Kaowax 230-2 | 0.05 | 0.05 |
| Trimethylolpropane Trimethacrylat | 0.1 | 0.1 |
| Master batch | 100 | 100 |
| Organic peroxide | 0.32 | 0.2 |
| Adhesion to heated roll | ○ | ○ |
| Shape of bank | Δ | ○ |
| Surface of molded product | ○ | ○ |

As described above according to the present invention, a thermoplastic elastomer composition which is excellent in calender-moldability and which is capable of producing a calender-molded sheet superior in appearance, and a sheet obtained by calender-molding the thermoplastic elastomer composition are provided.

What is claimed is:

1. A thermoplastic elastomer composition for calender-molding obtained by dynamically heat-treating a mixture comprising 40 to 95% by weight of the component (A) and 60 to 5% by weight of the component (B), the sum of the components (A) and (B) being 100% by weight, respectively described below:

(A) an oil-extended olefin copolymer rubber containing 100 parts by weight of an olefin copolymer rubber having a Mooney viscosity ($ML_{1+4}100°$ C.) of 120 to 350 and 20 to 150 parts by weight of mineral oil softening agent, and (B) a polypropylene resin composed of a propylene homopolymer as a first segment and a propylene-ethylene random copolymer having an intrinsic viscosity of tetralin solution at a temperature of 135° C. of 0.5 to 6.0 dl/g and a weight ratio of ethylene to propylene of 10/90 to 60/40 as a second segment, wherein the weight ratio of the first segment to the second segment is 95/5 to 50/50.

2. The thermoplastic elastomer composition according to claim 1, the dynamic heat-treatment is carried out in the presence of an organic peroxide.

3. The thermoplastic elastomer composition according to claim 1, the dynamic heat-treatment is carried out in the presence of an organic peroxide and a crosslinking aid.

4. The thermoplastic elastomer composition according to claim 3, wherein the crosslinking aid is a methacrylate crosslinking aid.

5. A process for producing a sheet, which comprises subjecting the thermoplastic elastomer composition of claim 1 to calender-molding.

6. A process for producing a sheet, which comprises subjecting the thermoplastic elastomer composition of claim 2 to calendar-molding.

7. A process for producing a sheet, which comprises subjecting the thermoplastic elastomer composition of claim 3 to calender-molding.

8. A process for producing a sheet, which comprises subjecting the thermoplastic elastomer composition of claim 4 to calender-molding.

9. A sheet obtained by the process of claim 5.
10. A sheet obtained by the process of claim 6.
11. A sheet obtained by the process of claim 7.
12. A sheet obtained by the process of claim 8.

* * * * *